(12) United States Patent
O'Neill

(10) Patent No.: US 8,141,696 B2
(45) Date of Patent: Mar. 27, 2012

(54) REPLACEABLE SOUND DAMPENING CONVEYOR CHAIN FLIGHT

(75) Inventor: Michael L O'Neill, Lucinda, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 322 days.

(21) Appl. No.: 12/433,332

(22) Filed: Apr. 30, 2009

(65) Prior Publication Data

US 2010/0276254 A1 Nov. 4, 2010

(51) Int. Cl.
*B65G 19/24* (2006.01)

(52) U.S. Cl. ........................................ 198/730

(58) Field of Classification Search .................. 198/728, 198/729, 730, 734, 850, 852; 474/228
See application file for complete search history.

(56) References Cited

U.S. PATENT DOCUMENTS

| | | | |
|---|---|---|---|
| 231,186 A | 8/1880 | Neacy | |
| 708,924 A | 9/1902 | Scott et al. | |
| 1,008,890 A | 11/1911 | Demarest | |
| 1,020,863 A | 3/1912 | Weichseldorfer | |
| 1,153,375 A | 9/1915 | Elliott | |
| 1,427,229 A | 8/1922 | Robbins et al. | |
| 2,754,957 A | 7/1956 | Dodson | |
| 2,761,548 A * | 9/1956 | Long | 198/733 |
| 3,103,275 A | 9/1963 | Rollins | |
| 3,225,897 A | 12/1965 | Rollins | |
| 3,324,990 A | 6/1967 | Karlovsky, Jr. | |
| 3,452,228 A | 6/1969 | Woolley | |
| 3,602,364 A | 8/1971 | Maglio et al. | |
| 4,238,028 A | 12/1980 | Lake | |
| 4,585,117 A | 4/1986 | Hahn | |
| 4,766,995 A | 8/1988 | Sterwerf, Jr. | |
| 4,899,868 A * | 2/1990 | Johnson | 198/520 |
| 5,000,310 A | 3/1991 | Edmondson | |
| 5,056,651 A * | 10/1991 | Nagamatsu | 198/725 |
| 5,186,526 A | 2/1993 | Pennington | |
| 6,662,932 B1 | 12/2003 | O'Neill | |
| 7,036,657 B1 * | 5/2006 | Robinson | 198/731 |
| 7,438,180 B1 * | 10/2008 | Taylor et al. | 198/861.2 |
| 2005/0274590 A1 | 12/2005 | Kwiat | |

FOREIGN PATENT DOCUMENTS

| | | |
|---|---|---|
| DE | 3151059 | 7/1983 |
| WO | 03013987 | 2/2003 |

OTHER PUBLICATIONS

Bureau of Mines United States Department of the Interior, "Noise Study of Longwall Mining Systems," Jan. 1986, Contract JO188072, Wyole Laboratories, cover page, p. 3, pp. 131-137, (9 pages).

* cited by examiner

*Primary Examiner* — Douglas Hess
(74) *Attorney, Agent, or Firm* — Michael Best & Friedrich LLP

(57) ABSTRACT

A conveyor flight for a chain comprising at least two spaced apart links, and two side plates that connect the links, with each side plate including two spaced apart extension pins extending from the side plate. The flight comprises a metal support, and the metal support includes two spaced apart cylindrical portions adapted to receive the two spaced apart extension pins. The flight also includes a flexible casing surrounding the metal support.

29 Claims, 4 Drawing Sheets

REPLACEABLE SOUND DAMPENING CONVEYOR CHAIN FLIGHT

BACKGROUND

The present invention relates to a chain and flight conveyor for use in conveying materials in the mining industry, and, in particular, to an improved design of a chain and flight conveyor. Still more particularly, this invention relates to conveyor chains for continuous miners and chain haulage units.

Conveyor flights with various coatings have been attempted in the past. The primary reason for these coatings was for noise control. While the coatings have been shown to reduce conveyor noise by 5-10 dBA, these materials wore off of the flights relatively quickly and were determined not to be of sufficient value for commercial use on continuous miners or longwall equipment. The coatings compressed beyond their working limit and began to tear and chuck out. One of the reasons for this failure is that the coating was too thin. There is a limited amount of space available on the conveyor for the flight bars, so in order to make the coating thicker, the integrity of the existing flight is compromised.

Urethane coating on conveyor chain flights has proven effective in reducing the noise exposure of continuous miner operators. The problems preventing widespread acceptance of this solution are the cost of implementation and maintenance of the chain, and the durability of the urethane coating.

The most successful urethane-coated flight design to date is a standard forged steel conveyor flight, which is machined down to reduce its thickness and thus allow room for the urethane coating. The machined-down flight is then used as a flight core, which is encapsulated in the urethane coating. But the coating is thinner than desired, and the corners of the steel flight cause stress concentration on the urethane coating. The end of the flight nearest the chain is currently enlarged and has holes to fit the chain pins. The urethane coating is undesirably thin due to the enlarged end of the flight.

The flight core is welded integral to the chain flight section, which is a part of the chain assembly. Replacing a flight due to loss of the urethane coating is expensive and difficult. If more than a few flights have lost their urethane coating, it is uneconomical to repair the chain, and the entire chain must be replaced.

SUMMARY

An object of this disclosure is to provide a conveyor chain having replaceable urethane-coated flights. With a conveyor chain having replaceable urethane-coated flights, it is then possible to replace damaged urethane coated flights in a few minutes with minimum downtime of the continuous miner.

This disclosure provides a conveyor flight for a chain comprising at least two spaced apart links, and two side plates that connect the links, with each side plate including two spaced apart extension pins extending from the side plate. The flight comprises a metal support, and the metal support includes two spaced apart cylindrical portions adapted to receive the two spaced apart extension pins. The flight also includes a flexible casing surrounding the metal support.

Figure 1:
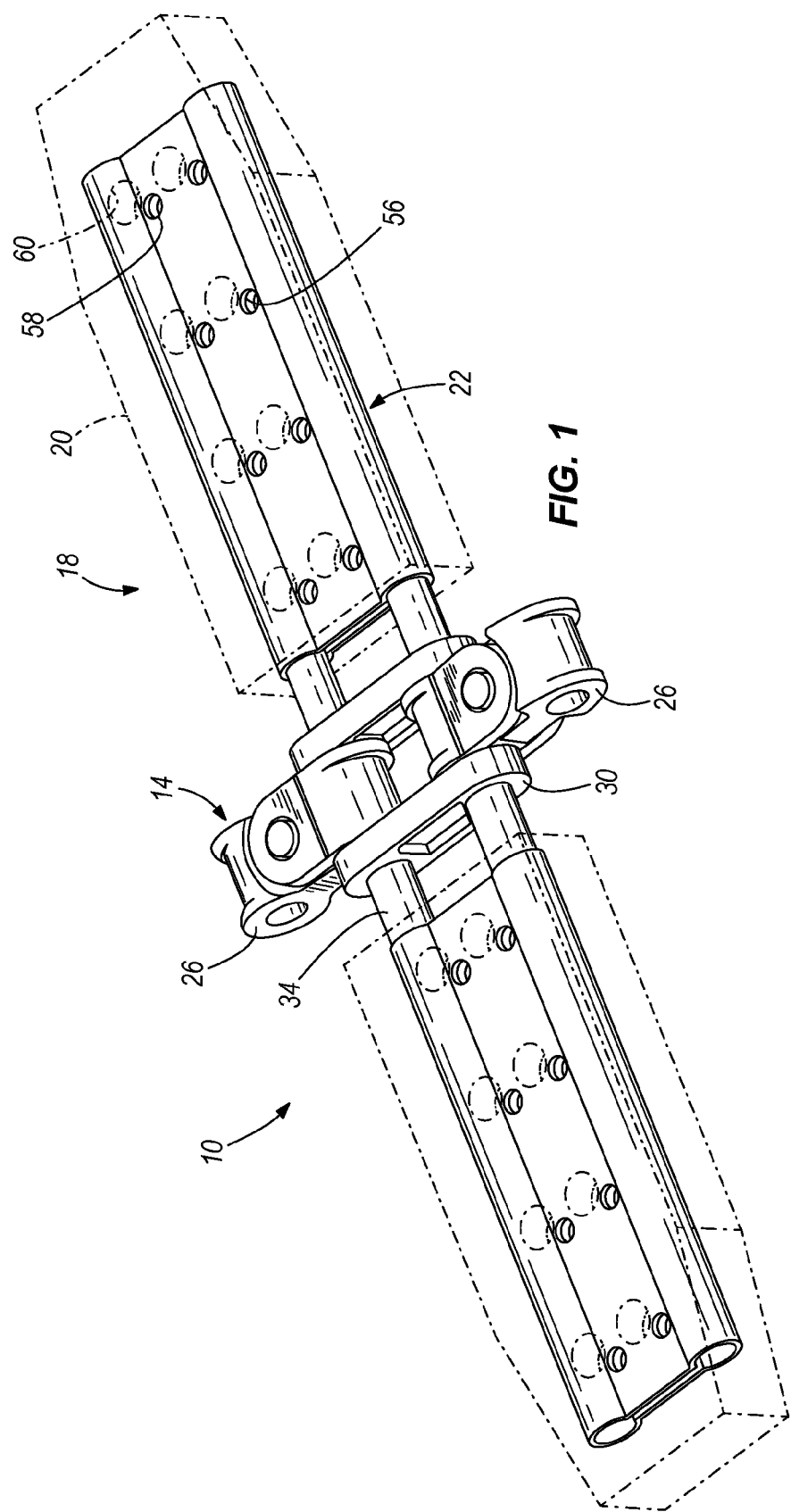
FIG. 1 is a partial perspective view of a conveyor including a chain and flights.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Figure 2:
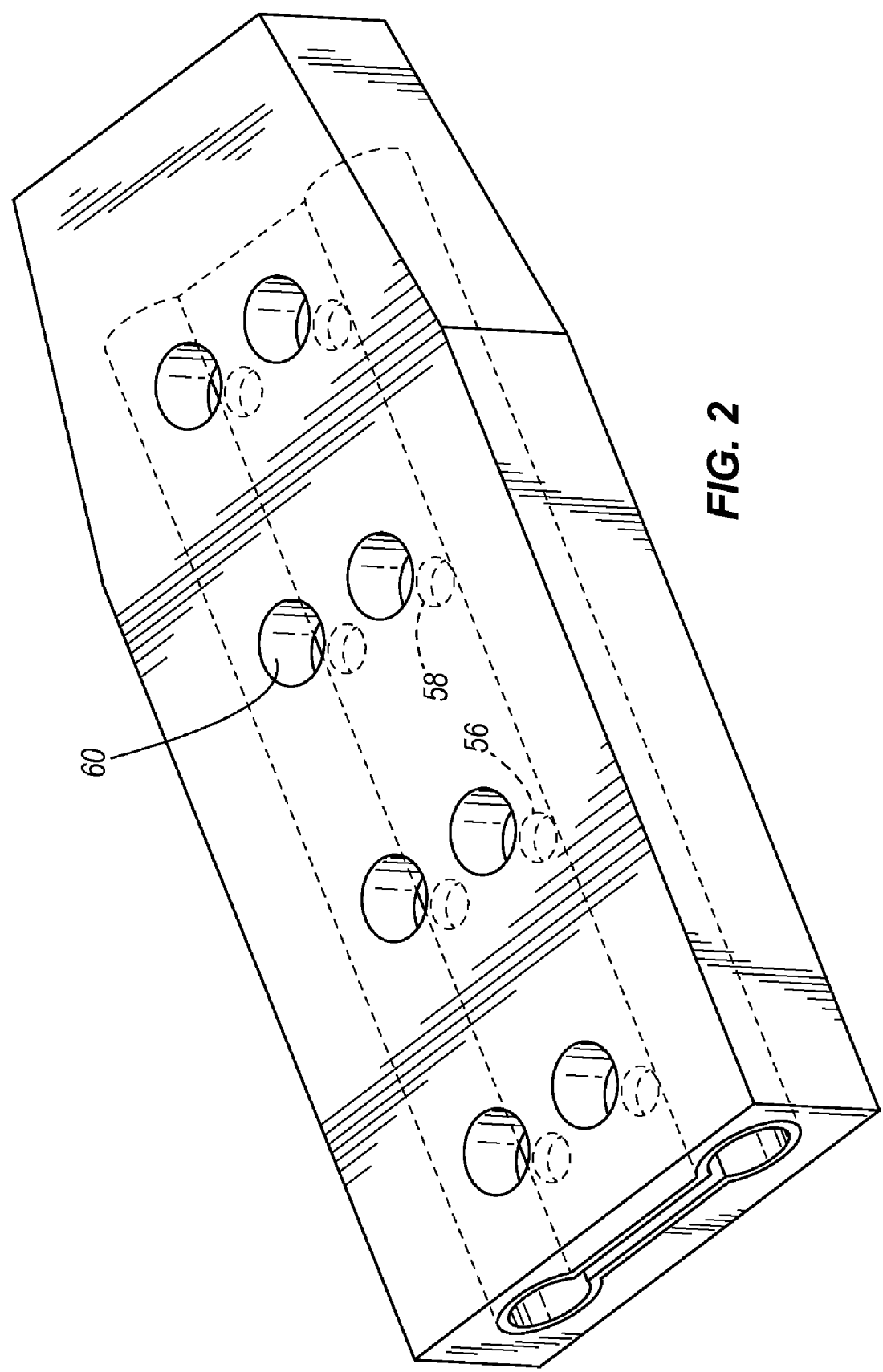
FIG. 2 is a perspective view of one flight including an internal core and an external urethane coating.

A conveyor 10 including a chain 14 and flights 18 is shown in FIG. 1. The flight 18 includes sound dampening material in the form of a urethane coating 20, and a metal support 22, in the form of an embedded steel plate core, is shown in FIG. 2. In other embodiments, other less preferred forms of a metal support, such as a block (not shown), can be used.

More particularly, the chain 14, as illustrated in FIG. 1, includes two swivel links 26 connected by two side plates 30. Although only two swivel links 26 connected by two side plates 30 are shown, the chain 14 usually is an endless chain (not shown), and flights 18 are attached at spaced apart locations along the chain 14.

Extending perpendicular to the direction of chain travel are two spaced apart pins 34 that extend outwardly from each of the side plates 30. Each of the flights 18 is attached to the spaced apart pins 34, as further explained below. As illustrated in FIG. 1, one set of the two spaced apart pins 34 extend to the left of the chain 14 and one set of the two spaced apart pins 34 extend to the right of the chain 14.

Figure 3:
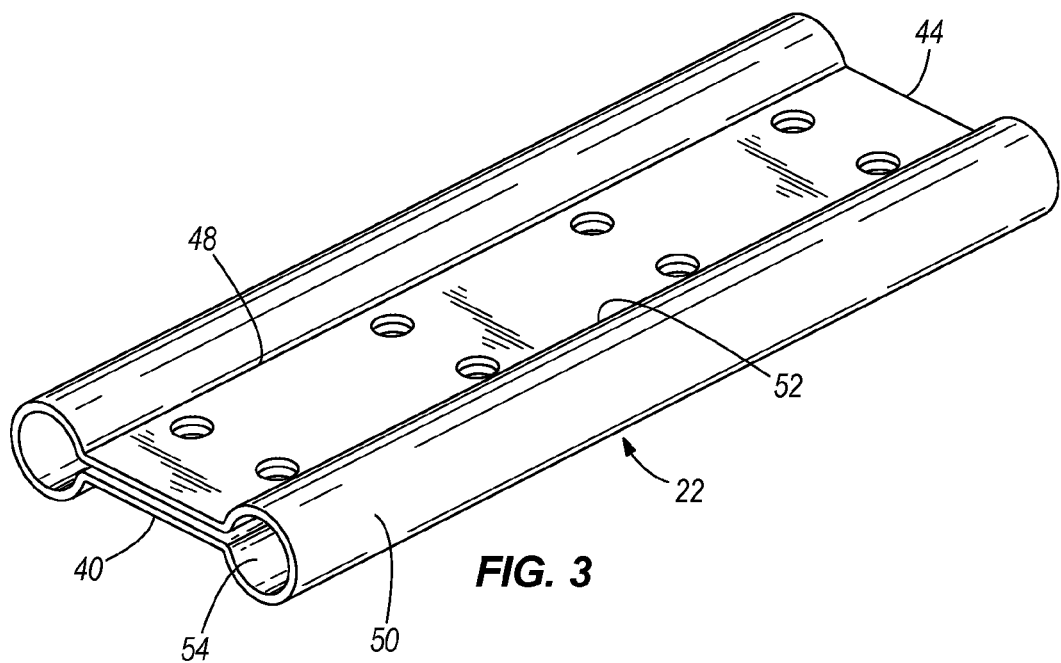
FIG. 3 is a perspective view of the internal core shown in FIG. 2.

Each flight 18 has the thin-walled steel core 22, leaving space for adequate thickness of the sound-dampening coating 20. The core 22, as shown in FIG. 3, is a flat steel plate having a first end 40 and a second end 44, and a left edge 48 and a right edge 52, as shown in FIG. 3. Each of the left and right edges of the core 22 has a cylindrical portion 50 that defines a cylindrical opening 54 that extends the length of the core 22. The cylindrical openings 54 receive the elongated chain pins 34. The core 22 is clamped onto the flight pins 34 by clamping means in the form of rivets or threaded fasteners 56 (see FIG. 1) that pass through openings 58 that extend only through the metal support 22. The core 22, together with the elongated pins 34, provides strength and rigidity to support the urethane outer shell 20 of the flight 18.

In order to permit access to the rivets or threaded fasteners 56, so that the flight 18 can be removed from the conveyor 10, or so a new flight 18 can replace a damaged one, openings 60 are present in the urethane coating 20 above the openings 58 through the metal support 22.

Figure 4:
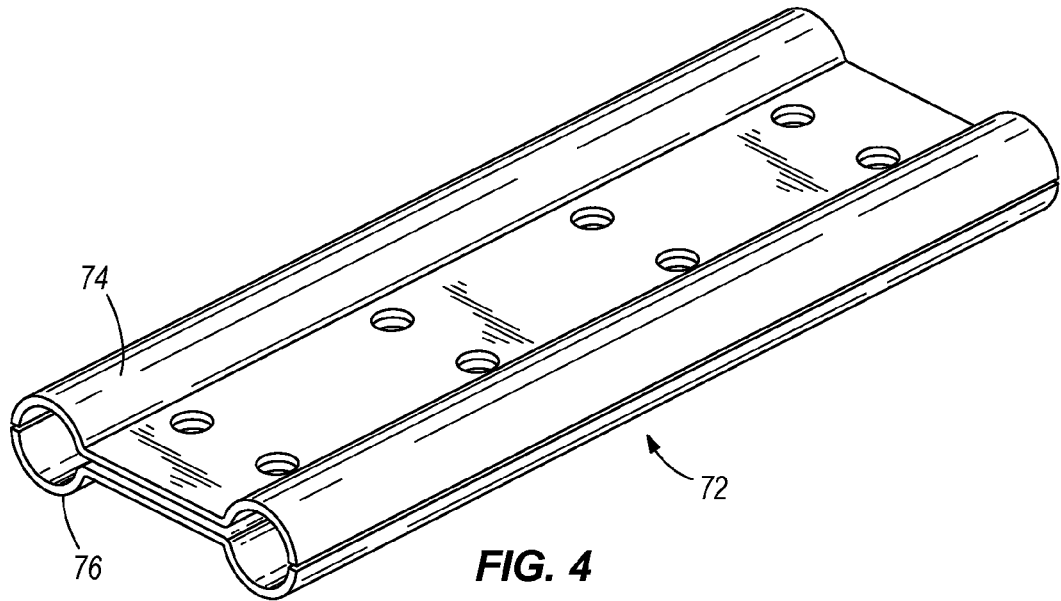
FIG. 4 is a perspective view of an alternate embodiment of the internal core shown in FIG. 3.

In one embodiment, not shown, the sound-dampening flight 18 can be made in multiple pieces that are glued together and onto the cores 22 at the same time. In the preferred embodiment, the flight 18 is molded directly onto the core 22. More particularly, the core 22 is inserted into a mold, and then the sound-dampening material 20 is poured over the core. The core can be one piece or two piece. Shown in FIG. 3 is a one-piece core 22 and shown in FIG. 4 is a core 72 made of two identical pieces 74 and 76, arranged symmetrically. The core can also be made into a single piece by welding two pieces along the edges. The one-piece core provides more reliable clamping onto the chain pins 34, but the two-piece core is be less expensive to manufacture.

Figure 5:
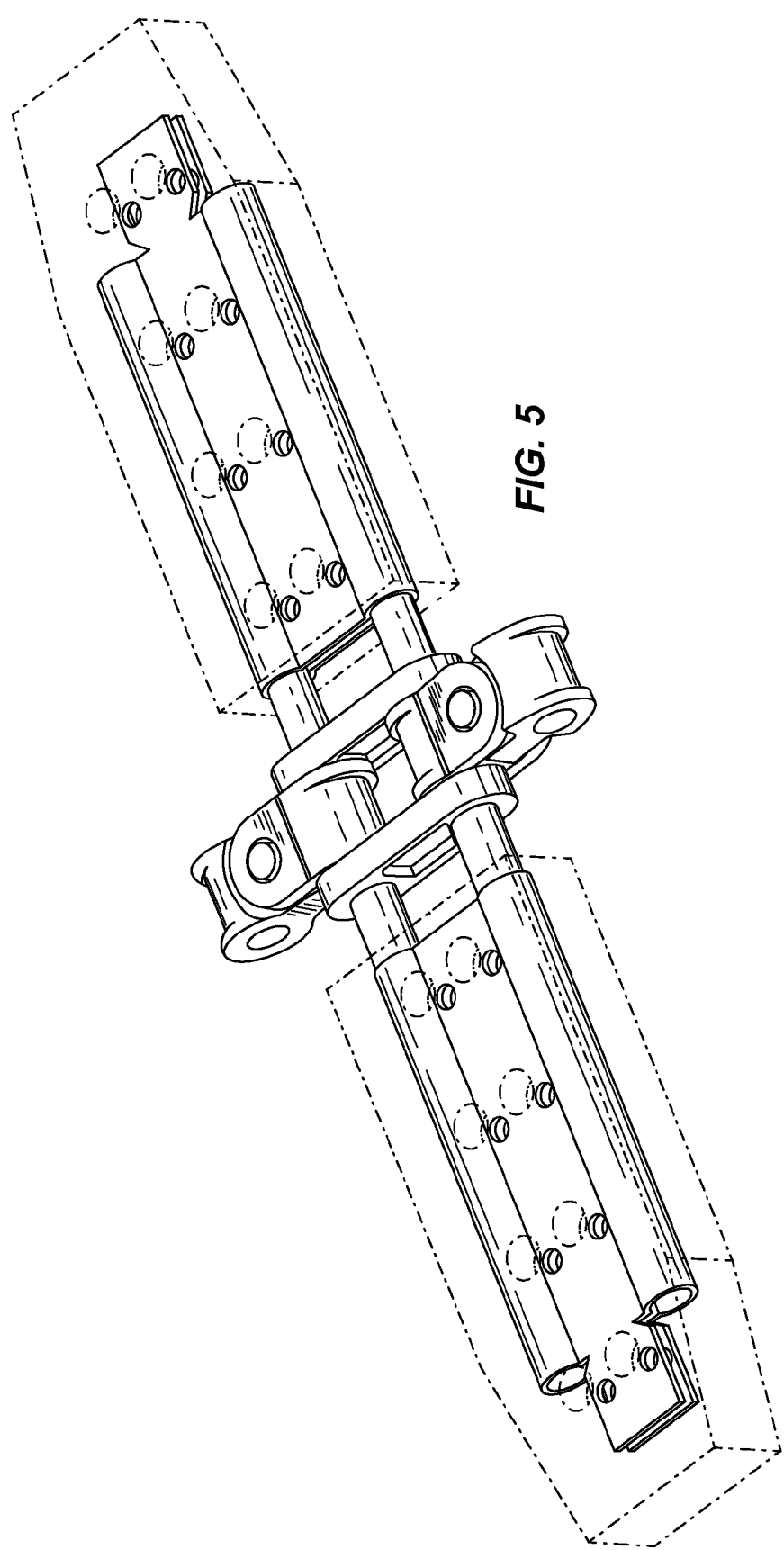
FIG. 5 is a partial perspective view of an alternate embodiment of a conveyor including a chain and flights.

As shown in FIG. 5, the length of the cylindrical openings 54 need not be the entire length of the core 22. When pins 34 that do not extend the entire length of the core 22 are used for economical reasons, the length of the cylindrical openings 54 can be suited to the length of pin extension 34. This also allows various widths of chain assembly to be easily made by simply selecting the flights of the desired width, and keeping the pin length common.

A dual-sprocket conveyor chain from U.S. Pat. No. 6,662,932, which is incorporated herein by reference, is shown in the illustrations. The concept could also be applied to standard single-sprocket conveyor chain. In the illustrations, the urethane flight is shown partially transparent to reveal the flight pins and core within.

The invention claimed is:

1. A replaceable conveyor flight for a chain including at least two spaced apart links, and two side plates that connect the links, with each side plate including two spaced apart extension pins extending from the side plate, said flight comprising
    a metal support, said metal support including two spaced apart cylindrical portions adapted to removably receive the two spaced apart extension pins and two spaced apart plate portions connecting said cylindrical portions, said plate portions being pressed together to removably connect said metal support to said extension pins, and
    a flexible casing surrounding said metal support, said metal support and said casing forming a unitary structure removably connectable to the chain.

2. A conveyor flight in accordance with claim 1 wherein said metal support is a steel plate.

3. A conveyor flight in accordance with claim 1 wherein said casing is made of urethane.

4. A conveyor flight in accordance with claim 1 wherein said cylindrical portions extend the full length of the metal support.

5. A conveyor flight in accordance with claim 1 wherein the cylindrical portion of the metal support is shorter than the full length of the metal support.

6. A conveyor flight in accordance with claim 1 wherein said metal support is formed of two separate symmetrical pieces attached together, each piece defining a complementary section of said two spaced apart cylindrical portions and including one of said plate portions connecting said sections of said two spaced apart cylindrical portions.

7. A conveyor flight in accordance with claim 1 further comprising structure to removably connect said metal support to said extension pins.

8. A conveyor flight in accordance with claim 7 wherein said metal support has openings there through, and wherein said structure to removably connect said metal support to said extension pins includes clamping means for releasable clamping said metal support on said extension pins, said clamping means being received through said openings in said metal support.

9. A conveyor flight in accordance with claim 8 wherein said flexible casing has openings there through for providing access to said clamping means.

10. A conveyor flight in accordance with claim 8 wherein the clamping means includes one of a fastener, a threaded fastener and a rivet.

11. A conveyor flight for a chain including at least two spaced apart links, and two side plates that connect the links, with each side plate including two spaced apart extension pins extending from the side plate, said flight comprising
    a metal support, said metal support including two spaced apart cylindrical portions adapted to receive the two spaced apart extension pins, and said metal support having openings there through,
    clamping means for releasably clamping said metal support on said extension pins, said clamping means being received through said openings in said metal support, and
    a flexible casing surrounding said metal support, said flexible casing having openings there through for providing access to said clamping means.

12. A conveyor flight in accordance with claim 11 wherein said cylindrical portions extend the full length of the metal support.

13. A conveyor flight in accordance with claim 11 wherein the cylindrical portion of the metal support is shorter than the full length of the metal support.

14. A conveyor flight in accordance with claim 11 wherein said metal support is formed by an upper plate and a lower plate, each plate defining a complementary section of said two spaced apart cylindrical portions and connecting said sections of said two spaced apart cylindrical portions.

15. A conveyor flight in accordance with claim 14 wherein said upper plate is spaced apart from said lower plate, said upper plate and said lower plate being pressed together to clamp said metal support to said extension pins.

16. A conveyor flight in accordance with claim 11 wherein the said metal support is a steel plate.

17. A conveyor flight in accordance with claim 11 wherein said casing is made of urethane.

18. A conveyor flight in accordance with claim 11 wherein the clamping means includes one of a fastener, a threaded fastener and a rivet.

19. A conveyor comprising a chain including at least two spaced apart links, and two side plates that connect the links, with each side plate including two spaced apart extension pins extending from the side plate, and a replaceable flight including
    a metal support, said metal support including two spaced apart cylindrical portions removably receiving the two spaced apart extension pins, and
    a flexible casing surrounding said metal support, said metal support and said casing forming a unitary structure removably connectable to the chain.

20. A conveyor in accordance with claim 19 wherein said metal support is a steel plate.

21. A conveyor in accordance with claim 19 wherein said casing is made of urethane.

22. A conveyor in accordance with claim 19 wherein said cylindrical portions extend the full length of the metal support.

23. A conveyor in accordance with claim 19 wherein the cylindrical portion of the metal support is shorter than the full length of the metal support.

24. A conveyor in accordance with claim 19 wherein said metal support is formed of two separate symmetrical pieces attached together, each piece defining a complementary section of said two spaced apart cylindrical portions and including a plate member connecting said sections of said two spaced apart cylindrical portions.

25. A conveyor in accordance with claim 24 wherein said plate member of one piece is spaced apart from said plate member of the other piece, said plate members being pressed together to connect said metal support to said extension pins.

26. A conveyor in accordance with claim 19 wherein said flight includes structure to removably connect said metal support to said extension pins.

27. A conveyor in accordance with claim 26 wherein said metal support has openings there through, and wherein said structure to removably connect said metal support to said extension pins includes clamping means for releasably clamping said metal support on said extension pins, said clamping means being received through said openings in said metal support.

28. A conveyor flight in accordance with claim 27 wherein said flexible casing has openings there through for providing access to said clamping means.

29. A conveyor in accordance with claim 27 wherein the clamping means includes one of a fastener, a threaded fastener and a rivet.

\* \* \* \* \*